US012123236B2

(12) United States Patent
Kaganov et al.

(10) Patent No.: US 12,123,236 B2
(45) Date of Patent: Oct. 22, 2024

(54) HINGE LOCK

(71) Applicant: Industrilås i Nässjö AB, Nässjö (SE)

(72) Inventors: Maxim Kaganov, Wuppertal (DE); Dirk Schäfer, Heiligenhaus (DE)

(73) Assignee: Industrilås i Nässjö AB, Nässjö (SE)

( * ) Notice: Subject to any disclaimer, the term of this patent is extended or adjusted under 35 U.S.C. 154(b) by 417 days.

(21) Appl. No.: 17/434,451

(22) PCT Filed: Feb. 26, 2020

(86) PCT No.: PCT/EP2020/055050
§ 371 (c)(1),
(2) Date: Aug. 27, 2021

(87) PCT Pub. No.: WO2020/174014
PCT Pub. Date: Sep. 3, 2020

(65) Prior Publication Data
US 2022/0136299 A1 May 5, 2022

(30) Foreign Application Priority Data
Feb. 27, 2019 (EP) .................................... 19159698

(51) Int. Cl.
*E05D 15/50* (2006.01)
*E05D 7/10* (2006.01)

(52) U.S. Cl.
CPC ......... *E05D 15/505* (2013.01); *E05D 7/1061* (2013.01); *E05Y 2201/68* (2013.01); *E05Y 2900/102* (2013.01)

(58) Field of Classification Search
CPC ..... E05D 15/50; E05D 15/505; E05D 7/1061; E05D 15/502; E05Y 2201/68; E05Y 2900/102
(Continued)

(56) References Cited

U.S. PATENT DOCUMENTS 7,343,762 B1 * 3/2008 East ........................ E05C 9/043 70/485
8,966,821 B2 * 3/2015 Walker .................. E05D 15/505 49/382
(Continued)

FOREIGN PATENT DOCUMENTS

CN 106869590 A * 6/2017 ............... E05B 1/00
DE 10 2017 129427 B3 11/2018
(Continued)

OTHER PUBLICATIONS

PCT International Search Report for corresponding PCT International Application No. PCT/EP2020/055050.
(Continued)

*Primary Examiner* — Kristina R Fulton
*Assistant Examiner* — James Edward Ignaczewski
(74) *Attorney, Agent, or Firm* — Olive Law Group, PLLC

(57) ABSTRACT

The invention relates to a hinge lock consisting of a first hinge part for fastening to the outside of a door and a second hinge part for fastening on the outside of a door frame, wherein the first hinge part has an actuating device, by means of which the first and the second hinge part can be unlocked and locked with one another. The actuating device interacts with a shaft, which is suitable for passing through the door. An inner handle is arranged at the end of the shaft facing away from the actuating device, by means of which the first and the second hinge part can be unlocked and locked with one another. The shaft is surrounded by at least one pipe part.

4 Claims, 3 Drawing Sheets

(58) Field of Classification Search
USPC ........................................................ 292/336.3
See application file for complete search history.

(56) References Cited

U.S. PATENT DOCUMENTS

| | | | | |
|---|---|---|---|---|
| 10,526,820 | B2 * | 1/2020 | Schroeder | E05B 79/06 |
| 10,590,687 | B1 * | 3/2020 | Cifers | E05D 7/12 |
| 2015/0292249 | A1 * | 10/2015 | Alfredsson | E05B 65/48 70/2 |
| 2018/0044957 | A1 * | 2/2018 | Höschler | E05D 7/1066 |
| 2021/0140212 | A1 * | 5/2021 | Rieboldt | E05D 15/505 |

FOREIGN PATENT DOCUMENTS

| | | | | |
|---|---|---|---|---|
| EP | 3473791 | A1 * | 4/2019 | E05D 7/1061 |
| WO | 2014/079512 | A1 | 5/2014 | |

OTHER PUBLICATIONS

PCT Written Opinion for corresponding PCT International Application No. PCT/EP2020/055050.

* cited by examiner

HINGE LOCK

CROSS REFERENCE TO RELATED APPLICATIONS

This application is a 35 USC 371 application of International PCT Patent Application No. PCT/EP2020/055050, filed on Feb. 26, 2020, which claims priority to European Patent Application No. 19159698.0, filed on Feb. 27, 2019; the contents of which are hereby incorporated by reference herein in their entireties.

The invention relates to a hinge lock consisting of a first hinge part for fastening to the outside of a door and a second hinge part for fastening on the outside of a door frame, wherein the first hinge part has an actuating device, by means of which the first and the second hinge part can be unlocked and locked with one another, wherein the actuating device interacts with a shank.

Hinge locks are components, using which doors or the like can be locked on the one hand and on the other hand can be pivoted about the lock. When using such hinge locks there is for example the option of providing four locks on a door, so that two locks in each case can be arranged opposite one another on the door. As a result, there is the option to pivot the door on both longitudinal sides about the axis predetermined by the hinges. One such hinge is known for example from WO 2014/079512 A1.

Hinge locks are often used on doors which form a cavity between two door skins. The cavity can be filled with insulating material for example. One speaks of doors with a sandwich construction in such cases. Such doors are usually used in air-conditioning and ventilation system construction or in refrigeration systems. In such systems, starting from a certain size of the space closed with the respective door, it is required that the door can also be opened from inside. This should prevent a person located in the space from being locked in the respective space in the event of an inadvertent closing of the door. To this end, DE 10 2017 129 427 B3 suggests an emergency unlocking device, which is arranged on the inside of the door. By pressing on the emergency unlocking device, the hinge lock can be unlocked, as a result of which the door can be opened. The person locked in the space can then leave the same through the door opening.

In the case of door locks, which are used in doors of sandwich construction, there is often the problem that, when fastening the fixtures forming the lock on the door, a considerably pressure must be exerted on the fittings, in order to ensure a reliable fastening on the respective door. Owing to the thin-walled design of the doors of sandwich construction and the insulating material provided between the outer surfaces of the door, there is the problem that the doors are deformed during the fastening of the fittings. This has a negative influence on the optical impression and gives the impression of a reduced quality. Furthermore, due to the deformation in the region of the fittings, gap formation may occur, as a result of which the sealing, which is usually provided, is cancelled. Consequently, moisture may enter into the inner chamber of the doors of sandwich construction. In addition, the insulating material may be damaged due to the deformation, as a result of which an impairment in relation to the quality of the insulation may be caused.

On the basis of this prior art, the present invention is based on the object of creating a hinge lock, which allows an actuation of both sides of the lock. According to the invention, this object is achieved by means of the features of claim 1.

Using the invention, a hinge lock is created, which can be actuated from both sides of the door. As a result, the requirement, according to which it must be possible to open the doors of equipment rooms in air-conditioning and ventilation system construction or in refrigeration systems, is satisfied.

In one embodiment, the shaft may extend through at least one pipe part. The pipe part may surround the shaft in a region where the shaft extends, when in use, between two door plates of the door on which the hinge lock is arranged. The pipe part may thereby prevent deformation of the door when the hinge lock is arranged on the door. Further, damage to the insulating material is prevented, as a result of which an impairment with regards to the quality of the insulation is prevented. Also, deformation in the region of fittings and gap formation connected therewith is prevented, so that the sealing provided acts reliably. The penetration of moisture into the inner chamber of the doors of sandwich construction is therefore prevented. The hinge lock may comprise a mounting plate configured to be arranged on one side of the door, and rosette on the opposite side of the door. The tube part may surround the shaft when extending between the mounting plate and the rosette, thereby preventing the door to be deformed when the mounting plate and the rosette is pressed towards each other when fastened.

In an embodiment of the invention, pipe parts may be provided with slots. The slots allow a spreading of the pipe parts, as a result of which the door skins may be supported reliably on the end sides of the pipe parts when screwing the hinge locks inside the door and thus effectively counteract a deformation of the door skins.

The inner handle may be arranged on an adapter. The adapter creates the possibility of allowing a flexible fastening option for various components.

Thus, a security catch may be fastened on the adapter. The security catch means that when opening the door from the outside, the door cannot suddenly pivot completely outwards, for example if an overpressure prevails in the closed space compared to the environment outside the space. The risk of injury due to a door springing open is reduced as a result.

In a development of the invention, the inner handle may have a hole, to which a rod connection can be fastened. With the aid of the rod connection, there is the option of synchronously unlocking or locking hinge locks, which are arranged adjacently to one another, by actuating only one handle. As a result, the ease of operation is increased considerably.

In one embodiment, a mounting plate is provided, on which a tab is arranged, which has a slotted link, which interacts with a sliding block guide in the mounted state. The combination of the sliding block guide with the slotted link forms an eccentric drive and enables a linear movement of the slotted link along the longitudinal central line of the first hinge part.

The hinge lock presented herein may alternatively be described as a hinge lock comprising a first hinge part for fastening to a door, and a second hinge part for fastening on a door frame, wherein the first hinge part has an actuating device, by means of which the first and second hinge part can be unlocked or lock to each other, which interacts with a shaft which extends, when in use, through the door. The actuating device comprises a mounting plate comprising a tab with a slotted link and a sliding block guide arranged on the shaft and interacting with the slotted link. The shaft and the sliding block guide are rotatably fixed relative each other, such that a rotation of the shaft provides the sliding block guide to interact with the slottet link causing linear movement of the tab which unlocks or locks the first and second hinge parts relative to each other.

The first hinge part may have a housing, which may have an essentially U-shaped form. The housing may be provided with holes, which are used for the passage of screws for fastening on the door. The mounting plate may likewise have holes, through which the screws can pass for fastening on the door. At its centre, the mounting plate may be provided with a hole. In the mounted state, the hole may be surrounded by the sliding block guide, which is arranged in a pivotable manner on the mounting plate.

The tab is arranged on the mounting plate. The combination of the sliding block guide with the slotted link may form an eccentric drive and enables a linear movement of the slotted link along the longitudinal central line of the first hinge part. The hinge lock may comprise a handle or tool actuator on the inner and/or outer side of the door when in use, arranged at respective ends of the shaft.

The actuation of the hinge lock may take place by actuation of the actuating device. During actuation, a movement of the shaft may be brought about. Due to this movement, owing to the contour provided in the sliding block guide, a movement of the sliding block guide may take place at the same time, which, with the aid of the slotted link, may effect a movement of the tabs along the longitudinal central line of the first hinge part. In the originally closed state of the hinge lock, a movement of the tab in the direction away from the second hinge part may be carried out when the lock is opened. As a result, the outermost end of the tab may travel back from the position where it interacts with the second hinge part. As a result, the cover may be released, so that the door can be opened. This process may take place in a reversed sequence when closing the door. The actuation of the shaft leads to a linear movement of the tab in the direction of the second hinge part, so that the outermost region of the tab facing the second hinge part travels under a pin of the second hinge part. At the same time, the pin is captured in a slot of the first hinge part, as a result of which the door is locked.

Other developments and embodiments of the invention are specified in the remaining dependent claims. Exemplary embodiments of the invention are illustrated in the drawings and are described in detail in the following. In the figures:

Figure 1:
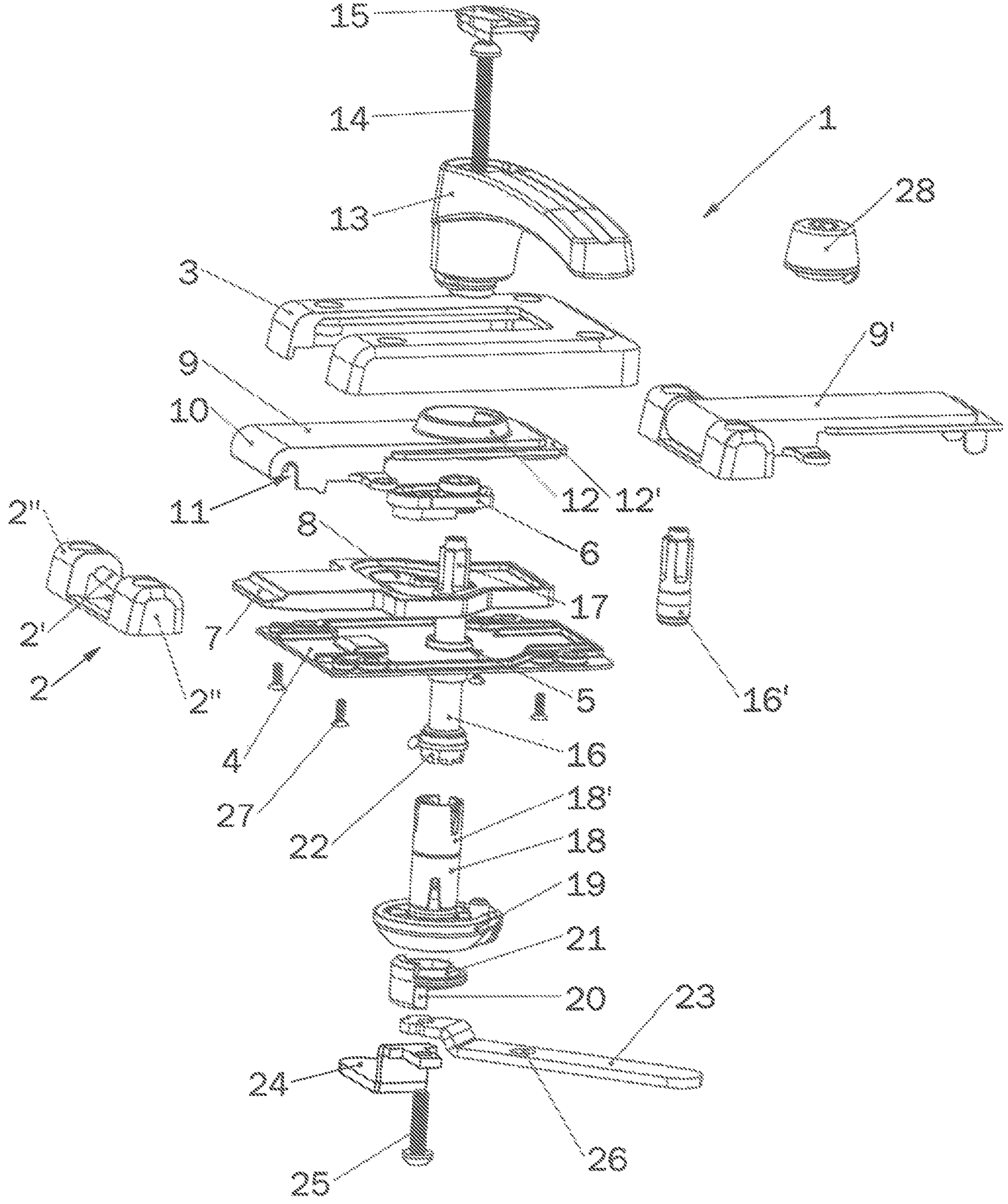
FIG. 1 shows the exploded illustration of a hinge lock according to the invention.
Figure 2:
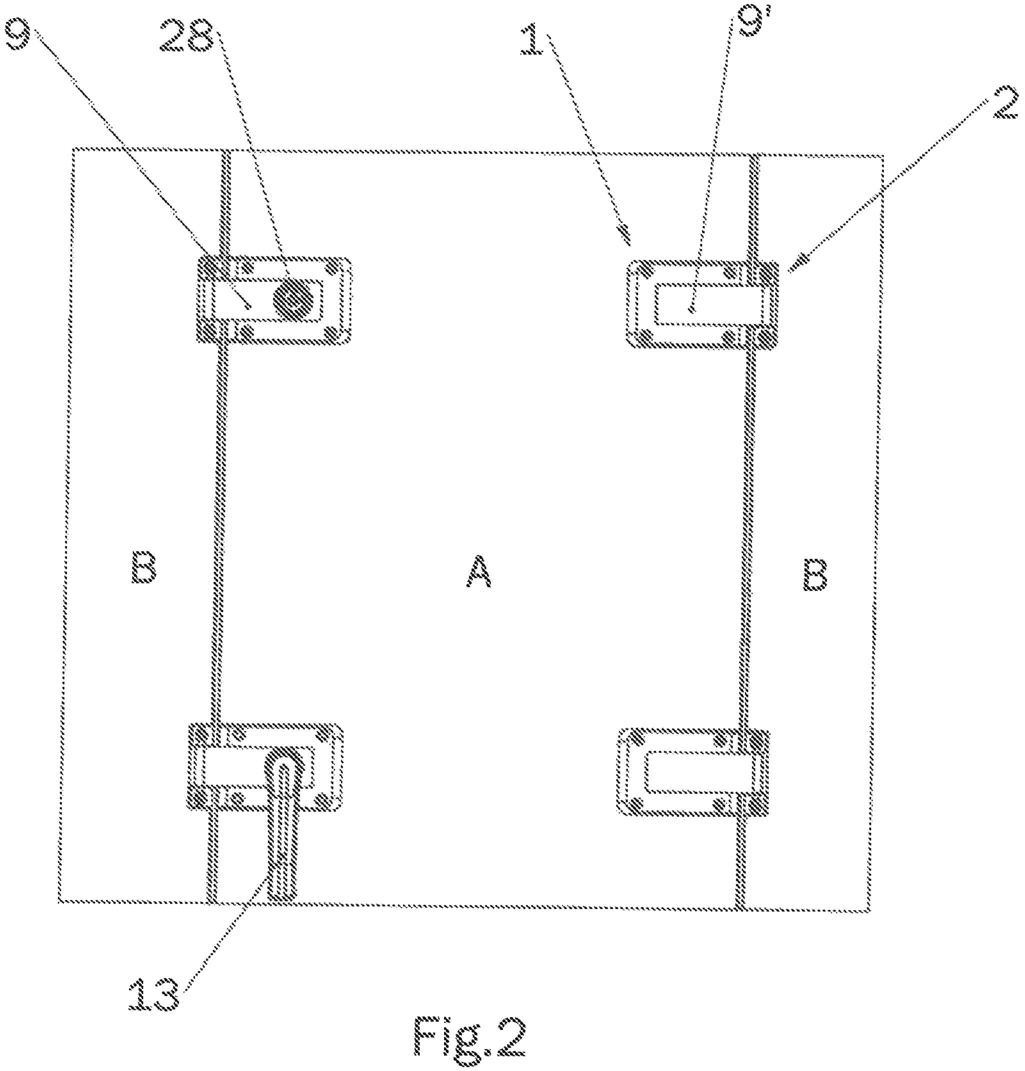
FIG. 2 shows the view of a door with four hinge locks.
Figure 3:
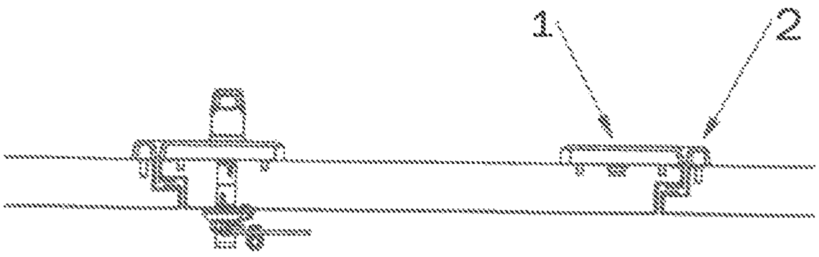
FIG. 3 shows the plan view onto the door illustrated in FIG. 2.

The hinge lock according to the invention consists of a first hinge part 1 and a second hinge part 2. The first hinge part 1 is provided for fastening to the outside of a door A, whereas the second hinge part 2 is provided for fastening on the outside of a door frame B surrounding the door A. The hinge lock according to the invention is provided for instance for use on cavity doors, which are formed from an outer door skin Aa and an inner door skin Ai. The cavity formed between the outer and the inner door skin is usually filled with insulating material.

The first hinge part 1 has a housing 3, which may have an essentially U-shaped form. The housing 3 is provided with holes, which are used for the passage of screws for fastening on the door A. On the side facing the door, the first hinge part 1 is covered by a mounting plate 4, which likewise has four holes, through which the screws can pass for fastening on the door. At its centre, the mounting plate 4 is provided with a hole 5. In the mounted state, the hole 5 is surrounded by a sliding block guide 6, which is arranged in a pivotable manner on the mounting plate 4.

In addition, a tab 7 is arranged on the mounting plate 4, which tab has a slotted link 8, which, in the mounted state, interacts with the sliding block guide 6. The combination of the sliding block guide 6 with the slotted link 8 forms an eccentric drive and enables a linear movement of the slotted link 8 along the longitudinal central line of the first hinge part 1. A cover 9 is provided between the legs of the U-shaped housing 3, which is provided at its end with a quadrant-shaped section 10, which is provided with a slot 11 on both of its end sides. At its centre, the cover 9 has a circular opening 12, which is surrounded by an edge. On the end side facing away from the section 10, the cover 9 is provided with a protrusion 12', which extends into the longitudinal sides of the cover 9 in certain regions.

The hinge lock has a handle 13, which is fastened to the hinge lock with the aid of a fastening screw 14. The fastening screw 14 is covered with an insert element 15. In the mounted state, the handle 13 is arranged in the region of the opening 12 and interacts with a shaft 16, 16'. The shaft 16 is of long design and therefore suitable for passing through the door. By using shafts of different lengths, there is the possibility of installing the hinge lock according to the invention on doors of different thickness, as the short shaft 16' illustrated in FIG. 1 makes clear. The short shaft 16' is additionally used if passage through the door is not required. In this case, the short shaft 16' may terminate in the region of the mounting plate 4. The shaft 16, 16' has a contour 17 at its end facing the handle 13, which contour on the one hand corresponds with a contour in the sliding block guide 6 and also a contour in the handle 13. This ensures that a rotational movement of the handle 13 can be transmitted both to the sliding block guide 6 and to the shaft 16, 16'. The shaft 16 is surrounded in the exemplary embodiment by two pipe parts 18 and 18', which have the function of a spacer. In a modification of the exemplary embodiment, only one pipe part may also be provided. The pipe parts 18, 18' are provided with slots on their mutually facing ends. The pipe parts 18, 18' are supported in the mounted state on the one hand on the side of the mounting plate 4 facing away from the handle 13, which mounting plate is provided with a conical form—which is not illustrated—and on the other hand on a rosette 19, which is fastened on the outside of the door skin Ai provided on the door inner side. The rosette 19 is provided at its centre with a pipe section—which is not illustrated and has a conical design.

In the mounted state, the rosette 19 accommodates an adapter 20, which is provided with a contour 21. The contour 21 on the adapter 20 corresponds to a contour 22 on the end of the shaft 16 facing away from the handle 13. An inner handle 23 is arranged on the adapter 20. Likewise, a security catch 24 is fastened on the adapter 20 in the exemplary embodiment. The fastening of the inner handle 23 and the security catch 24 takes place with the aid of a fastening screw 25. The inner handle 23 has a hole 26.

The second hinge part 2 is constructed in the manner of a lock bridge. It comprises a pin 2', which is mounted in two bearing blocks 2". The pin 2' is aligned parallel to the door frame B in the mounted state of the second hinge part 2. The bearing blocks 2" are in each case provided with holes, which are used for passing through screws for fastening on the door frame.

In the case of the hinge lock according to the invention, the second hinge part 2 is fastened on the door frame B on the outside of the space to be closed using the respective door. This takes place with the aid of conventional fastening screws, which are screwed through the holes into the bearing blocks 2" in the door frame B. Then, the first hinge part 1 is mounted on the outside of the door A. This takes place in a simple manner by means of the assembly of the first hinge part 1, in that the mounting plate 4, the sliding block guide 6, the tab 7 and the housing 3 are connected to one another with the aid of screws 27. The combination of the components thus-formed is positioned on the outer door skin Aa in such a manner that the hole 5 is arranged in the mounting plate 4 over the hole located in the door. In the mounted state, the shaft 16 passes through the hole located in the door. At the same time, the shaft 16 is surrounded by the pipe parts 18, 18'. In this state, the handle 13 is placed onto the first hinge part 1 and screwed to the shaft 16, 16' by means of the fastening screw 14. Likewise, the rosette 19 is placed onto the inner door skin Ai. Then, the adapter 20, the inner handle 23 and the security catch 24 are mounted. The combination of the components is screwed together with the aid of the fastening screw 25.

The shaft 16 is tightened by screwing, both with the aid of the fastening screw 14 from the outside of the door and with the screw 25 from the inside of the door. Owing to the conical construction of the pipe section of the rosette 19 and the conical construction of the pipe attachment on the side of the mounting plate 4 facing the door, a spreading of the pipe parts 18, 18' takes place during the tightening of the shaft. This is enabled owing to the slotted construction of the ends of the pipe parts 18, 18' facing away from one another. The spreading means that the door skins Aa, Ai are in each case supported on the pipe parts 18, 18' on the inside and on the outside of the door A. As a result, during the tightening of the shaft 16, that is to say the fastening of the entire hinge lock on the door, the pressure exerted on the door skins Aa, Ai is prevented from being too large, so that deformation is caused at the door skins. Rather, it is ensured that the cavity between the outer door skin Aa and the inner door skin Ai is not reduced in size. The appearance of the door A therefore conforms to expectations. Leaks in the region of the fittings due to deformation of the outer door skin Aa and/or the inner door skin Ai are also prevented as a result.

The actuation of the hinge lock in the mounted position takes place in a simple manner by actuating either the handle 13 or the inner handle 23. During actuation of one of the two handles, a movement of the shaft 16 is brought about owing to the contour 17 interacting with the handle 13 or the contour 21, provided on the adapter 20, interacting with the contour 22 of the shaft 16. Due to this movement, owing to the contour provided in the sliding block guide 6, a movement of the sliding block guide 6 takes place at the same time, which, with the aid of the slotted link 8, effects a movement of the tabs 7 along the longitudinal central line of the housing 3. In the originally closed state of the hinge lock, a movement of the tab 7 in the direction away from the lock bridge 2 is carried out when the lock is opened. As a result, the outermost end of the tab 7 travels back from the position captured by the lock bridge 2. As a result, the cover 9 is released, so that the door can be opened. This process takes place in a reversed sequence when closing the door. The actuation of the handle 13 or the inner handle 23 leads to a linear movement of the tab 7 in the direction of the lock bridge 2, so that the outermost region of the tab 7 facing the lock bridge 2 travels under the pin 2" provided in the lock bridge 2. At the same time, the pin 2" is captured in the slots 11 of the cover 9, as a result of which the door A is locked.

Owing to the inner handle 23 provided according to the invention on the inside of the room to be locked, first, the option is created to provide a hinge lock, which also allows opening of the door from the inside, which makes it possible, particularly in emergency situations or in the event of inadvertent slamming shut of the door, for the person who is locked-in to open the door and leave the room independently. As a result, the danger of becoming trapped is reduced.

The security catch 24 provided on the inside in this case means that when opening the door with the aid of the handle 13, that is to say from the outside, the door cannot suddenly pivot completely outwards, for example in cases, in which an overpressure prevails in the space closed by the door compared to the environment outside the space. In this case, although the door would suddenly open a gap; the security catch 24 prevents the door from pivoting open completely. Rather, the security catch 24 bears against the door frame B from the inside, so that the door A is captured. It is thereby prevented from swinging open independently. Only in the event of a backwards directed movement of the handle 13 into its initial position is the security catch 24 moved into a position which allows opening of the door.

In a modification of the exemplary embodiment, there is also the possibility of using the hinge lock according to the invention as a hinge. In this case, as can be seen, the cover 9' illustrated in the figures is realized without the opening 12. In this case, it is possible to dispense with the whole mechanism for handle actuation, in particular, the handle 13 and the inner handle 23, the security catch 24 and all parts, which are used for movability or enable opening and closing, can be dispensed with. There is also the possibility in a modification of the exemplary embodiment not to actuate the hinge lock according to the invention with the aid of a handle, but rather with the aid of a tool. Tool actuation 28 can be used to this end, which can be applied to the opening 12 of the cover 9. It then takes on the function of the handle. Security against abusive opening of the respective door is increased by the tool actuation 28.

Figure 4:
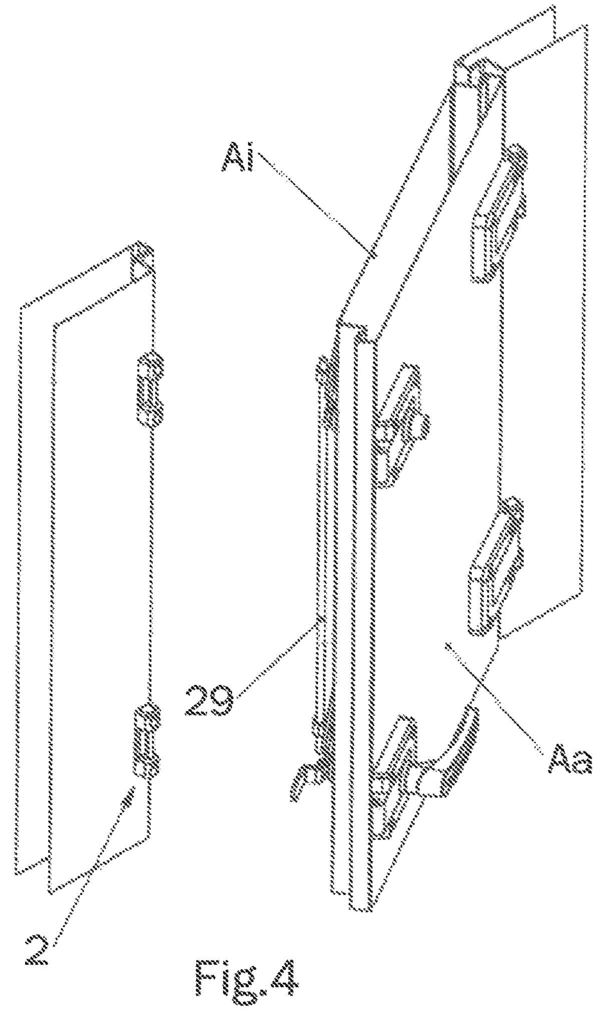
FIG. 4 shows the perspective illustration of the door illustrated in FIG. 2 in a partially open position.
Figure 5:
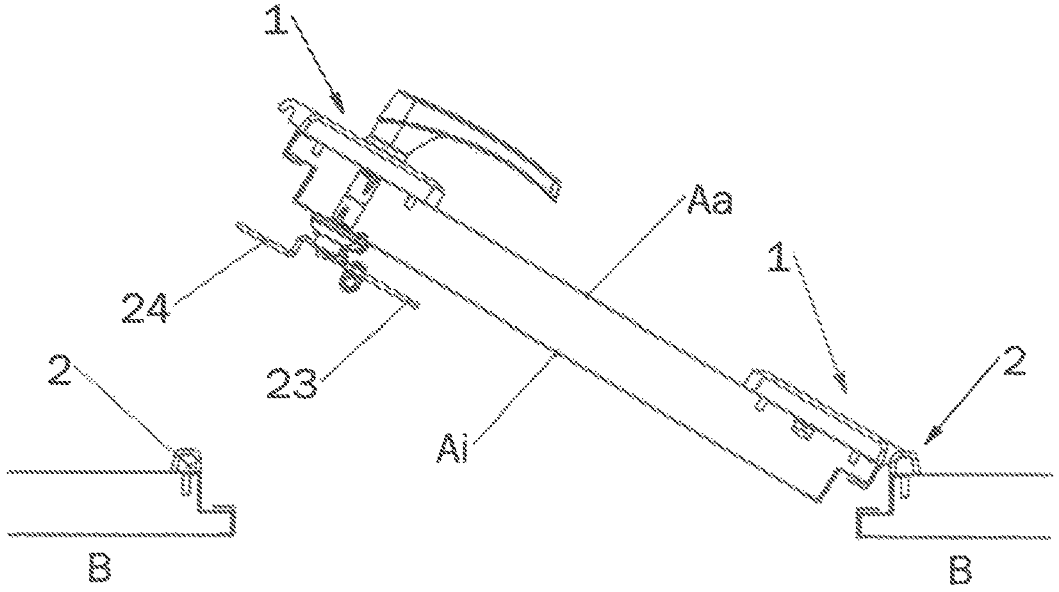
FIG. 5 shows the plan view onto the door illustrated in FIG. 2 in a partially open position.

A rod connection 29 may be provided for connecting adjacent hinge locks on a door. The rod connection 29 is then fastened on the one hand in the hole 26 of the inner handle 23 on a lower hinge lock and on the other hand in a comparable hole in a further inner handle—which is not illustrated—on an upper hinge lock (cf. FIG. 4). As a result, the connection to a further hinge lock attached to the respective door can be produced if two or more hinge locks are arranged above one another on a door. Then, the synchronous actuation of the mutually connected hinge locks can take place by means of just one handle, both in the case of actuation from inside and from outside. This rod connection 29 creates the possibility of actuation by means of just one handle, particularly in the case of doors which are large or arranged at a height and are provided with a plurality of hinge locks on one side of a door, which is conventional in particular in the case of doors which are large or arranged at a height.

Overall, the hinge lock according to the invention increases the possible applications of known hinge locks. In this case, it is ensured above all that the respective door can also be opened from inside, which was previously only the case in previous hinge locks by means of emergency unlocking. Active unlocking and locking from the inside of the door was not possible using known hinge locks. Consequently, both security and ease of operation are increased by means of the hinge lock according to the invention. At the same time, the security catch 24 provided according to the invention offers an additional option of increasing security, because due to this, the door can be prevented from swinging open independently due to an overpressure in the respective space when the door is opened from outside. Furthermore, with the aid of the inner handle 23 and the hole 26 provided in the same, the possibility is created, of producing the connection to a further hinge lock attached to the respective door with the aid of the rod connection 29, as can be seen from FIG. 4. This rod connection 29 creates the possibility of actuating the hinge locks arranged above one another by means of just one handle, if a plurality of hinge locks are provided on one side of a door, which is conventional in particular in the case of doors which are large or arranged at a height. This is advantageous above all in cases in which one of the two handles is hard for the user to reach owing to the local conditions.

The invention claimed is:

1. A hinge lock consisting of a first hinge part for fastening to a door and a second hinge part for fastening on a door frame, wherein the first hinge part has an actuating device, by means of which the first and the second hinge part can be unlocked and locked with one another, wherein the hinge lock further comprises an outer handle or a tool actuator by means of which the actuating device can be operated, wherein the actuating device comprises a moveable tab provided on a mounting plate, by which movement of the tab of the first hinge part and the second hinge part are unlocked or locked to each other, wherein the mounting plate has a slotted link, and wherein the actuating device interacts with a shaft, which extends, when in use, through the door, wherein the outer handle or tool actuator is arranged to an end of the shaft, and wherein an inner handle is arranged to an end of the shaft opposite the end to which the outer handle or tool actuator is arranged, by means of which inner handle the actuating device can be operated, wherein the outer and inner handles are directly mounted to opposite ends of the shaft for coaxial rotation with the shaft; and wherein a sliding block guide is rotationally fixed to the shaft and configured to interact with the slotted link of the mounting plate such that rotation of the shaft provides the sliding block guide to interact with the slotted link causing linear movement of the tab to unlock or lock the first and second hinge parts to each other, the shaft being rotated by means of the inner handle or by means of the outer handle or tool actuator arranged to opposite respective ends of the shaft.

2. The hinge lock according to claim 1, wherein the inner handle is arranged on an adapter.

3. The hinge lock according to claim 2, wherein a security catch is fastened on the adapter.

4. The hinge lock according to claim 1, wherein the inner handle has a hole, to which a rod connection can be fastened.

* * * * *